United States Patent
Farrell

(10) Patent No.: US 6,236,751 B1
(45) Date of Patent: May 22, 2001

(54) AUTOMATIC METHOD FOR DETERMINING PIECEWISE LINEAR TRANSFORMATION FROM AN IMAGE HISTOGRAM

(75) Inventor: Barbara L. Farrell, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/159,043

(22) Filed: Sep. 23, 1998

(51) Int. Cl.$^7$ .................................................... G06K 9/00
(52) U.S. Cl. ........................ 382/168; 382/169; 382/172; 382/274
(58) Field of Search .................................. 382/168, 169, 382/172, 274; 358/521, 522, 519, 455

(56) References Cited

U.S. PATENT DOCUMENTS

| | | | |
|---|---|---|---|
| 5,046,118 | * | 9/1991 | Ajewole et al. ................. 358/461 |
| 5,426,517 | * | 6/1995 | Schwartz ........................... 358/520 |
| 5,901,243 | * | 5/1999 | Beretta ............................... 382/168 |
| 6,091,853 | * | 7/2000 | Otto ................................... 382/232 |

* cited by examiner

*Primary Examiner*—Phuoc Tran
(74) *Attorney, Agent, or Firm*—Fay, Sharpe, Fagan, Minnich & McKee, LLP

(57) ABSTRACT

An image desired to be reproduced is scanned to determine its video pixel grey values. A histogram generator generates a histogram distribution representing a frequency of the grey values. The histogram distribution is analyzed to determine a minimum and maximum input grey values which define input boundaries. A segment point is computed between the input boundaries based on the histogram data. The segment point defines a plurality of input segments between the input boundaries. A dynamic output range is selected. Each input segment is mapped to an output segment based on a linear transformation for the corresponding segment. In this manner, a tone reproduction curve map having a piecewise linear transformation is automatically generated from the image histogram data.

17 Claims, 15 Drawing Sheets

AUTOMATIC METHOD FOR DETERMINING PIECEWISE LINEAR TRANSFORMATION FROM AN IMAGE HISTOGRAM

FIELD OF THE PRESENT INVENTION

The present invention is directed to the digital imaging arts. It finds particular application to a system and method of automatically generating a tone reproduction curve defining a piecewise linear transformation based on an image histogram and will be described with particular reference thereto.

BACKGROUND OF THE PRESENT INVENTION

In a conventional reproduction machine, a document (image) is scanned so that light reflected from the document causes a latent image of electrical charges to form on a photoreceptor. This latent image is then developed with toner, and the toner is transferred to a recording medium to produce a copy of the scanned document. These systems are commonly referred to as light-lens or non-digital copying systems.

The quality of a light-lens reproduction machine is a function of how well the copy matches the original. As is well know, various factors can impact this quality. For example, the scanning station can impact the quality if the optical path of the scanning station is not properly aligned. Also, the development station can impact the quality if a photoreceptor is not properly cleaned.

With the advent of digital reproduction machines, the above copy process for making a copy has changed. In a digital process, a document or image is scanned by a digital scanner which converts the light reflected from the document into electrical charges representing the light intensity from predetermined areas (pixels) of the document. These charges, after suitable processing, are converted into image signals or pixels of image data to be used by the digital reproduction machine to recreate the scanned image.

The pixels of image data are processed by an image processing system which converts the pixels of image data into signals which can be utilized by a printing device to recreate the scanned image. This printing device may be either a xerographic printer, ink jet printer, thermal printer, or any other type of printing device which is capable of converting digital data into a mark on a recording medium.

As with the light-lens systems, the quality of a reproduction machine is still a function of how well the copy matches the original. However, in this digital environment, other factors can now contribute to or impact the quality of the reproduced image. For example, the scanner can impact the quality if the scanner is not properly calibrated. Also, the output (printing) device can impact the quality if a printhead is clogged or a photoreceptor is not properly cleaned. But, the aspect of the digital system which can have the greatest impact is the digital (image) processing of the image data because a digital machine must convert light to a digital signal and then convert the digital signal to a mark on a recording medium. In other words, the image processing system provides the transfer function between the light reflected from the document to the mark on the recording medium.

Quality can be measured in many different ways. One way is to look at the characteristics of the reproduced image. An example of such a characteristic for determining the quality of the reproduced image is the contrast of the image. The contrast of an imaged (copied) document is the most commonly used characteristic for measuring quality since contrast provides a good overall assessment of the image's quality.

In a digital reproduction machine, the image processing system can greatly impact the contrast of the image. Thus, to assure high quality at the output printing device, it is desirable to know the contrast of the image being scanned prior to the image processing stage because, with this knowledge, the image processing system can process the image data so that the reproduced image has the proper contrast. One way of obtaining this contrast information prior to digital image processing is for the digital reproduction machine to generate a grey level histogram, which gives an easy to read measure of the image contrast. The image or grey level histogram describes the statistical distribution of grey levels of an image in terms of the number of pixels at each grey level. In other words, the number of pixels within an image that are associated with a certain grey level.

A histogram can be represented graphically with intensity on the horizontal axis from 0 to 255, if an eight-bit per pixel sampling resolution is utilized, and the number of pixels on the vertical axis. Using this graphical representation, a histogram can illustrate whether an image is basically dark or light and high or low contrast. It is important to know that when an image is represented by histogram, all spatial information is lost. The histogram specifies the number of pixels of each grey level but gives no indication where these pixels are located in the image. In other words, very different images may have very similar histograms.

Conventionally, when creating a histogram of the scanned image, a digital reproduction system samples a document, collects intensity data from the document, and uses this information to determine the document's background value. In such conventional systems, the computed background value of the document represents the average intensity of the document.

Histograms of low contrast images appear as a large, broad distributions or "modes" of pixel intensities in the grey scale and other grey regions completely unoccupied. High contrast shows up as a bimodal histogram where two, tall, thin peaks exist at the outer intensity regions.

Enhancement of an image (to correct for image degradations such as under or over-exposure, poor lighting, etc.) can be achieved by modifying the histogram of an image. This "contrast enhancement", is often made up of a combination of two linear transformations known as histogram slide and histogram stretch. These operations, based on an image's contrast and dynamic range characteristics, redistribute the histogram so that contrast and dynamic range may be enhanced. The objective of contrast enhancement is to utilize the full dynamic range to reveal the intensity variations (details) within the image that may not be visible until after the transformation.

The histogram sliding operation is simply the addition or subtraction of a constant intensity level to all pixels in the image. Doing this to every pixel effectively slides the entire input image histogram to the right or left. The basic effect of histogram sliding is a lightening or darkening of the image. Since the resulting histogram is only shifted, the contrast of the output image will be identical to that of the input image.

The linear transformation or tone reproduction curve (TRC) map for a sliding operation will always be a 45 degree line (this is why the image contrast is maintained). For a slide of zero, the line would pass through the origin. For a positive slide (>0), the line will pass through the vertical axis (output intensity). For a negative slide, the line will pass through horizontal axis (input intensity). A positive slide effectively lightens an image, while a negative slide darkens an image.

Histogram stretching is the multiplication of all pixels in the image by a constant value. For example, a histogram, with all the pixels residing in the lower half of the grey scale range, will spread out to occupy the entire grey scale range when multiplied by a constant of two (2). This stretching operation expands or reduces the contrast and dynamic range of an image. The TRC map will always be a straight line passing through the origin. For the case of a stretch of one (1), the line would be at a 45 degree angle. In general, contrast enhancement is carried out in conjunction with histogram sliding.

Typically, in a scanner, the histogram of an image is determined from a prescan. The minimum and maximum reflectance (or intensity) of the image area scanned, ($R_{min}$ and $R_{max}$) respectively, are determined from this scan. The grey scale transformation of shifting and stretching the grey scale to occupy the entire dynamic range is simply a mapping function from the input grey scale into a transformed output grey scale. This is normally accomplished with a look-up table. The "classic" method of dynamic range modification effectively shifts the input grey scale by $R_{min}$ and then stretches the input dynamic range ($R_{min}$ to $R_{max}$) to the available output dynamic range, given by equation (1):

$$P_{NEW} = (P_{OLD} - R_{min}) * \frac{(Z_{max} - Z_{min})}{(R_{max} - R_{min})} \quad (1)$$

where $P_{OLD}$ is the original pixel value, ($Z_{max}-Z_{min}$) is the largest possible dynamic range for the system, $R_{max}$ is the image reflectance value such that the sum of the image area which contains reflectances above $R_{max}$ is less than a prescribed percentage of the total image area, and $R_{min}$ is the image reflectance value such that the sum of the image area which contains reflectances below $R_{min}$ is less than a prescribed percentage of the total image area. For example, the percentage can be around three percent. Defining $R_{min}$ and $R_{max}$ as we do, allows a greater "range" to stretch the rest of the grey levels. However, this definition of $R_{max}$ and $R_{min}$ instead of the absolute minimum and maximum reflectance values within an image will cause equation (1) to effectively compress the grey level ranges of $P_{OLD}<R_{min}$ and $P_{old}>R_{max}$ by saturating them. This is usually tolerable, though, because, since by definition, very few pixels have grey levels in these ranges, hence, little image information should be lost.

As an example for illustration, assume that $R_{min}$ is 63 and $R_{max}$ is 127. The first term in equation (1) will shift each pixel to the left by $R_{min}$ or 63 in this case. The maximum dynamic range available is $Z_{max}-Z_{min}$ or 255. The actual dynamic range used is $R_{max}-R_{min}$ or 127−63=64. Therefore, all pixels in the image will be shifted by 63 and multiplied by 4 (255/64=4) to fill the entire available dynamic range.

In "Techniques for Image Processing and Classification in Remote Sensing," by Robert A. Schowengerdt, Academic Press, 1983, it was contended that if the image histogram is asymmetric, it is impossible to simultaneously control the average grey level of the output image and the amount of saturation at the ends of the histogram with a simple linear transformation. The article suggests a two (or more) segment piecewise linear transformation, to make better use of the available grey level range. One would need to manually determine a series of linear steps designed to expand the individual intensity ranges in which the data fall to fill the available dynamic range. Thus, one could designate a series of $R_{min}$ and $R_{max}$ values and use equation (1), within each region. The automation of this process and defining the boundaries of these segments in the TRC map is the subject of the discussion below.

SUMMARY OF THE PRESENT INVENTION

In accordance with one aspect of the present invention, a method of generating a real-time tone reproduction curve map is provided. A portion of an image is scanned and input grey values which form the image are determined. A histogram of frequency distributions of the input grey values is generated. A tone reproduction curve map is generated which transforms the input grey values to output grey values based on the histogram of the input grey values.

In a more limited aspect of the present invention, the transforming includes a piecewise linear transformation.

In accordance with another aspect of the present invention, a method of automatically generating a piecewise linear transformation from an image histogram of input grey value frequency distributions is provided. The input grey value frequency distributions are analyzed and a plurality of input grey value segments based on the input grey value frequency distributions are defined. A plurality of linear transformations, one linear transformation associated for each of the plurality of input grey value segments, are determined which map input grey values to output grey values. The plurality of linear transformations included at least two different linear transformations.

In a more limited aspect of the present invention, the defining includes determining a segment point based on an input grey value located at an identifiable characteristic in the input grey value frequency distributions of the image histogram.

One advantage of the present invention is that a tone reproduction curve is automatically generated based on histogram data.

Another advantage of the present invention is that input segments are automatically generated based on an image histogram such that a piecewise linear transformation is obtained.

Another advantage of the present invention is that different areas of input grey values are transformed to output grey values based on different linear transformations. This provides for a plurality of transformations obtaining a plurality of image enhancements during reproduction.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
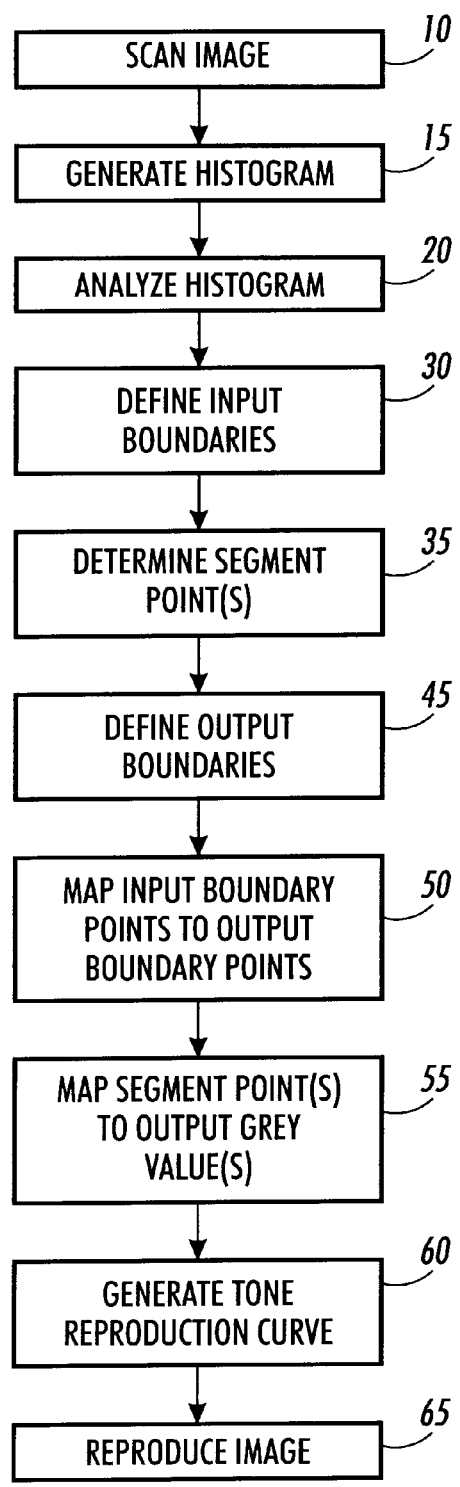
FIG. 1 is a block diagram of an image reproduction system including generation of a piecewise linear transformation in accordance with the present invention.

With reference to FIG. 1, an image or document to be reproduced is scanned 10. Video pixel grey values are determined from the scanned image and a histogram distribution is generated 15 representing a frequency of each grey value. The histogram is analyzed 20 to determine characteristic features of the scanned image which will affect the manner in which the image grey values will be mapped to output grey values. Analysis of histograms are described, for example, in U.S. Pat. No. 5,751,848 entitled "A System and Method for Generating and Utilizing Histogram Data From a Scanned Image" which is assigned to the present assignee and is incorporated herein by reference. A tone reproduction curve is generated automatically from the histogram data which maps the input grey values to output grey values.

Figure 2:
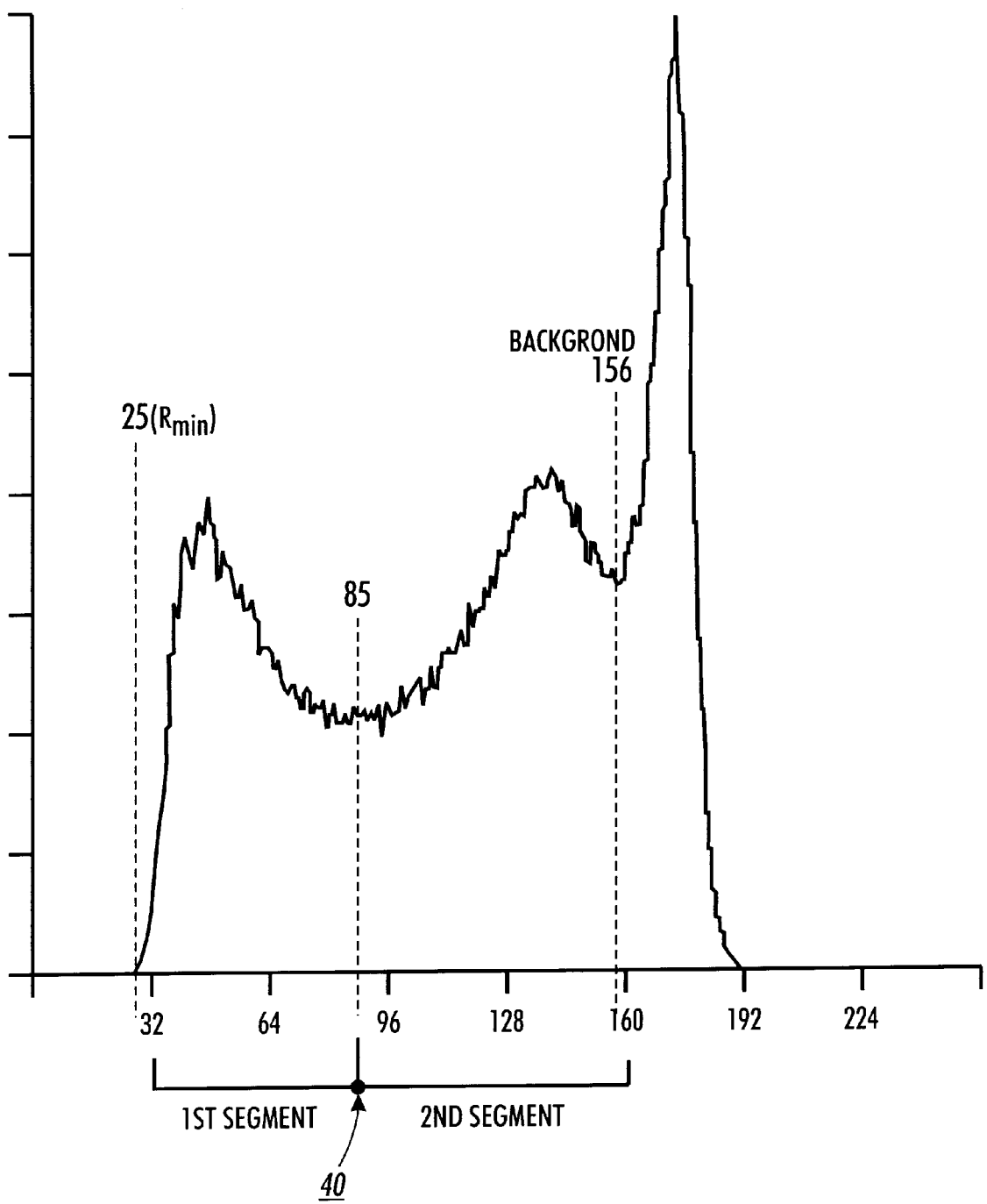
FIG. 2 is a histogram distribution of a halftone image.

FIG. 2 illustrates an exemplary histogram 25 as generated from a scanned image. The input grey values of the image appear on the x-axis and their frequency of occurrence appears on the y-axis. Upon analyzing the frequency distributions of the grey values, input boundaries are defined 30 which designate the grey values that will be mapped. In other words, grey values outside of the input boundaries (eg. at the ends of the x-axis) are trimmed off and eliminated from reproduction. Reducing the input boundary range is advantageous because it allows a greater range to stretch the input data which provides greater image enhancement.

The determination 30 of the input boundaries is affected by the type of the scanned image. Based on the image type, the input boundaries are found in different manners. The histogram analyzation 20 determines whether the scanned image is a halftone image type or a photograph type. A halftone image includes black and white halftone images and color half tone images. An indicating characteristic of a halftone image is the existence of a large peak in the highlight region of the grey values which typically indicates background grey values as seen in FIG. 2. It is advantageous, when reproducing an image, to eliminate or suppress as many background grey values as possible. Determining background grey values from a histogram is described in U.S. Pat. No. 5,751,848 referenced above. In FIG. 2, the beginning background grey value is determined at grey value 156. This value is set as the maximum input boundary which is designated as the maximum reflectance value $R_{max}$ of the histogram. Input grey values above $R_{max}$ will not be mapped or reproduced.

With further reference to FIG. 2, the minimum input boundary, which is designated as a minimum reflectance value $R_{min}$ is determined from the histogram data. $R_{min}$ is set at a grey value which has an image reflectance value (grey value) such that the sum of the image area which contains reflectance values below $R_{min}$ is less than a predetermined percentage of the total image area. In other words, in FIG. 2, $R_{min}$ is found to be grey value 25 meaning that the sum of the pixels having grey values between 0 and 25 is less than 3 percent of the total number of pixels in the scanned image. Of course, the predetermined percentage can be modified by the system or in real-time by a user to adjust the image enhancement. Thus, $R_{min}$ and $R_{max}$ define the input grey value boundaries which will be mapped to output grey values and ultimately reproduced.

Figure 5:
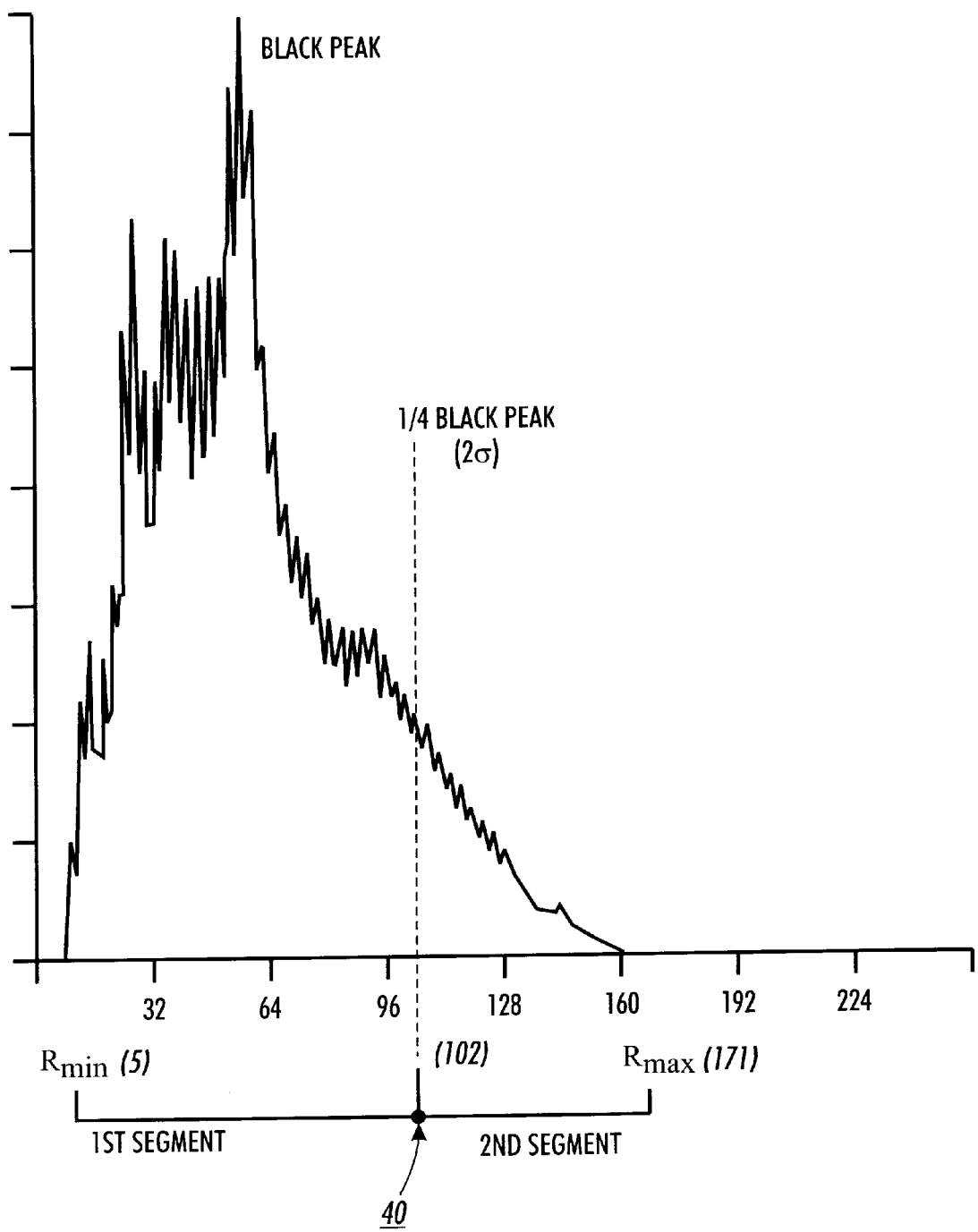
FIG. 5 illustrates a histogram distribution of a photograph.

In FIG. 2, $R_{max}$ is determined based on the background grey values which are present in the halftone image histogram. However, certain images do not have background grey values. For example, FIG. 5 shows a histogram of a scanned photograph which illustrates a predominately dark image having no background peak in the highlight region at the left end of the x-axis. In this case, $R_{max}$ is determined in a similar manner as $R_{min}$ is found for the halftone image of FIG. 2. $R_{max}$ is set at a grey value such that the image area which contains reflectances above $R_{max}$ is less than a predetermined percentage of the total image area. If the predetermined percentage is 3 percent, then the sum of pixels having grey values greater than $R_{max}$ would be less than 3 percent the total number of pixels in the histogram. Of course, the predetermined percentage can be changed to obtain different enhancing results.

With reference again to FIG. 2, after the input boundaries $R_{min}$ and $R_{max}$ are defined, the area between the boundaries are divided into segments by determining 35 one or more segment points. For ease of explanation, only one segment point 40 is shown in FIG. 2 which divides the input area into a 1st segment and a 2nd segment as shown on the x-axis. The segment point 40 is found by analyzing the histogram data beginning from the $R_{min}$ value until an identifiable characteristic is found, for example, a peak, a valley, or an offset value from a peak or valley.

In this case, a valley between two peaks is located at grey value 85 which is set as the segment point 40. The segment point 40 defines the first segment between $R_{min}$ (grey value 25) and 85 and the second segment between grey value 85 and $R_{max}$ (156). Thus, the boundaries and segment point are automatically determined from the histogram data which become the basis for a piecewise linear transformation to map the input grey values to a set of output grey values.

Figure 3:
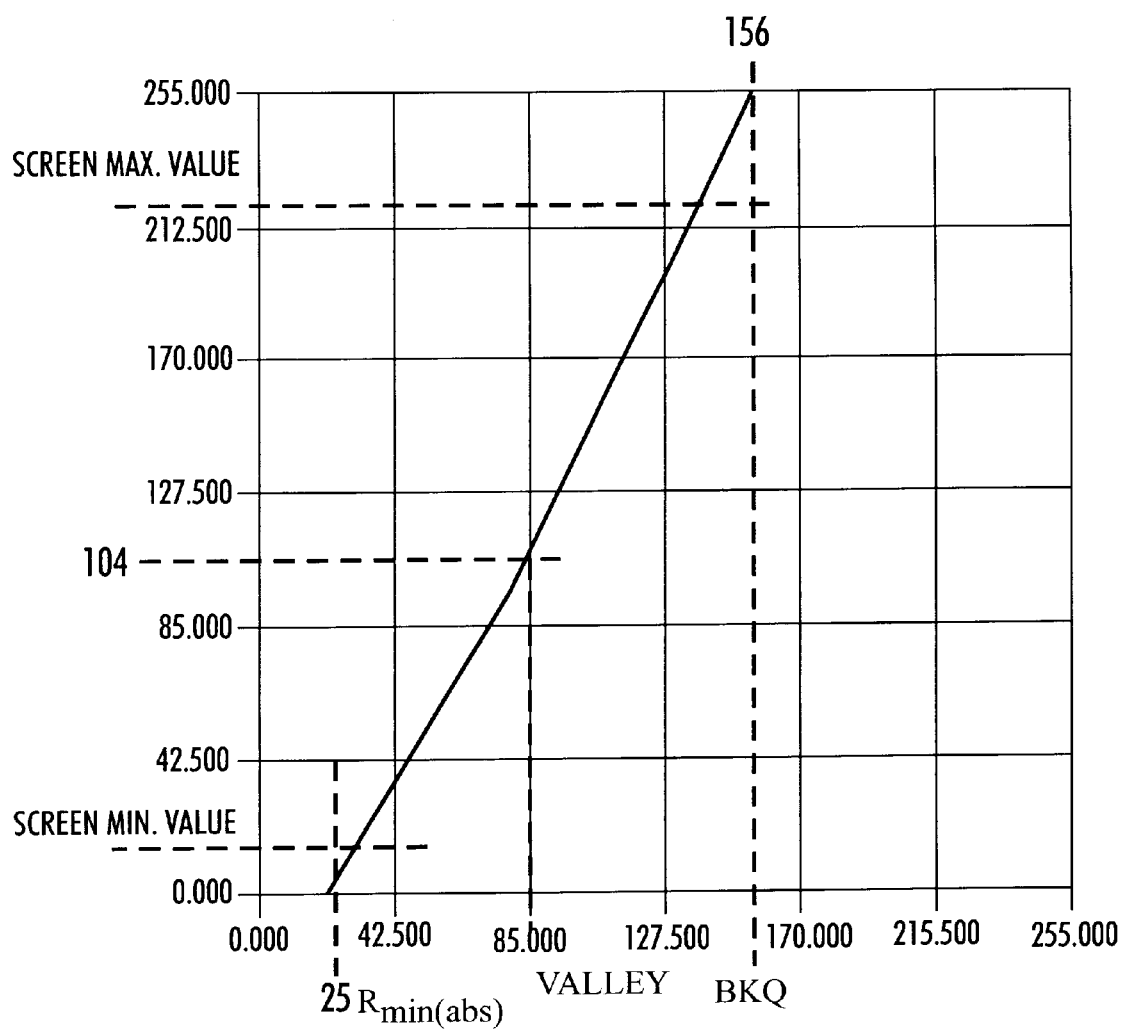
FIG. 3 illustrates a piecewise linear transformation map for the image of FIG. 2 based on a system dynamic output range in accordance with the present invention.

Once the necessary input values are determined as described above, output boundaries are defined 45 which define a dynamic range of output grey values to which the input grey values will be mapped. The output dynamic range can be limited to that of the system or the screen used. With reference to FIG. 3, a dynamic range of the system is shown being from 0–255. In other words, using a system dynamic output range, the input grey values between $R_{min}$ (25) to $R_{max}$ (156) are mapped to output grey values between 0 and 255 which is the largest possible output grey level range for an 8 bit system. It is noted that for many systems, the available output grey level range is limited to the "whitest white" of the system as determined during a scanner calibration process.

With further reference to FIG. 3, the minimum input value $R_{min}$ is mapped to the minimum output value which is 0.0. The segment point (grey value 85) is then mapped 55 to an output grey value. The output grey value is determined based on a percentage of input pixels with grey values between the first segment of the input range. For example, the percentage of grey values in the first segment which is between values 25 and 85 is, for example, 40.6 percent of the total number of grey values between the input boundaries. The percentage is then multiplied by the dynamic output range to give the output grey value. Since the dynamic output range is the system range, its value is 255−0=255. Thus, 0.406×255=104. Therefore, the segment point (input grey value 85) is mapped to output grey value 104.

With further reference to FIG. 3 the remaining input grey values are now mapped to output grey values based on a slope of their corresponding segment. In other words the slope of the first segment which is between points (25, 0) and (85, 104) defines a one-to-one linear transformation of the input grey values in the first segment to output grey values between 0 and 104. Similarly, the second segment defines a different slope between points (85, 104) and (156, 255) which defines a one-to-one linear transformation of the input grey values in the second segment to output grey values between 104 and 255. A tone reproduction curve is generated 60 which maps the input grey values to the output grey values based on two different linear transformations. Preferably, the tone reproduction curve is generated as a look-up table. The image is then reproduced 65 in accordance with the tone reproduction curve.

Figure 4:
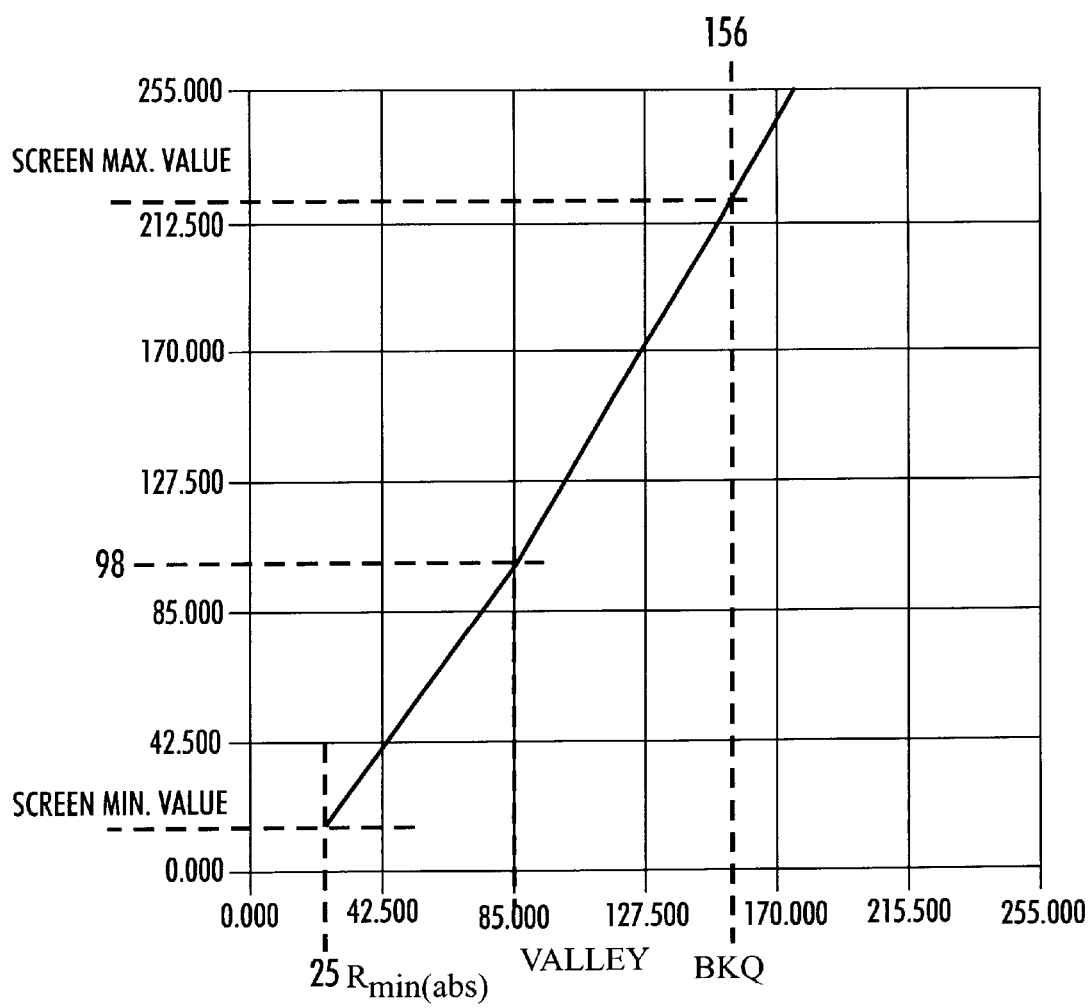
FIG. 4 is a piecewise linear transformation map for the image of FIG. 2 based on a half tone screen dynamic output range in accordance with the present invention.

If the image is screened, however, this approach wastes input grey levels since many input values may be mapped to output values outside the halftone screen and would, thus, be saturated black or white. Image detail in screen images is better reproduced if the output range used is equal to the range of the halftone screen used instead of the system range of 255. Mapping the input grey values based on a dynamic range of the halftone screen is shown in FIG. 4. The range of the halftone screen is predetermined and in this case, has a screen minimum value of 14 and a screen maximum value of 220. The transformation between input values to output values is identical to that of using the system range except that the output boundaries are not 0 to 255 but rather, 14 to 220. The dynamic range of the halftone screen now becomes 220−14=206.

Mapping the segment point (input grey value 85) to an output grey value is now found by multiplying the percentage of input pixels within the first segment by the dynamic range of the halftone screen: 0.406×206=84. However, since the minimum screen value is offset by 14, the determined output grey value of 84 is similarly offset by 14 giving a final value of 98. Thus, input grey value 85 is mapped to output grey value 98. As described above, a slope is determined for the first segment points between the end points of (25, 14) and (85, 98) which defines a linear transformation for the input grey values to the output grey values. Likewise, a slope is found for the second segment between end points (85, 98) and (156, 220). A tone reproduction curve is then generated based on the multiple linear transformations defined by the two segments.

The only difference between using the halftone screen range rather than the system screen range is that a positive shift (equal to the lower bound value of the screen used) is added to the transformation value. Highlight detail rendition is improved at the slight expense of shadow detail. For very noisy images, such as those printed on newsprint, however, a resulting artifact may be that a small amount of background spots are brought out. The second method calculates the percentage of input dynamic range in a segment out of the total input dynamic range which is calculated as the maximum output boundary (background value) minus $R_{min}$. This percentage is multiplied by the dynamic output range of the screen.

It is noted that one drawback to this approach is that, though image detail rendition is greatly improved, when the dynamic output range is limited to that of the screen, the contrast of the image is effectively reduced since a smaller number of input pixels will be saturated white or black.

With reference to FIG. 5, an illustration of an image histogram for a photograph is shown. As mentioned above, for black and white or color photographs, the term "image background" cannot be used, and in many cases, there are not distinct peaks or valleys in the image histograms. For cases where valleys are not distinct, as often seen in histograms of photographs, a segment point 40 is determined from a value one quarter of the black peak value (2 sigma black value). Thus, the first segment is defined between $R_{min}$ to the ¼ black peak and the second segment is defined from the ¼ black peak to $R_{max}$ since no image background value is available. As defined previously, $R_{min}$ and $R_{max}$ are set to a grey value such that the sum of pixels outside the $R_{min}$ and $R_{max}$ values are below a predetermined percentage of the total number of pixels in the histogram. In FIG. 5, $R_{min}$ is found to be grey value 5 and $R_{max}$ is found to be grey value 171. The ¼ black peak value, which is two standard deviations from the black peak value is found, for example, by the method described in U.S. Pat. No. 5,751,848 reference above.

Figure 6:
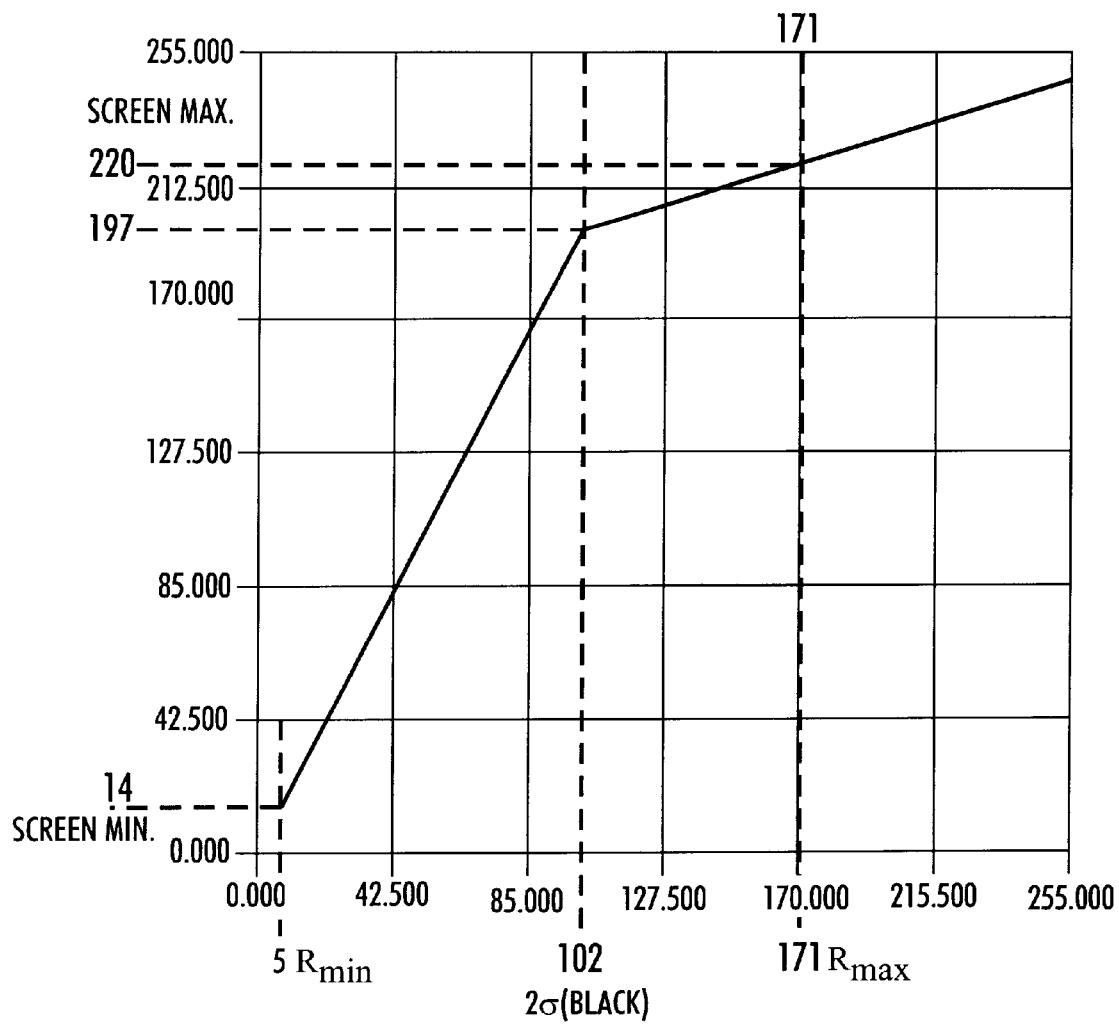
FIG. 6 is a piecewise linear transformation map for the image of FIG. 5.

With reference to FIG. 6, a tone reproduction curve map is illustrated for the image histogram of FIG. 5 where the image is adjusted with a piecewise linear tone reproduction curve. One can see that the first segment (between grey values 5 and 102) are mapped to a much larger output grey value range (grey values 14 to 197). This improves the shadow detail rendition for this image because the dark grey values are expanded to provide more detail in the shadow region.

In the tone reproduction curve map of FIG. 6, the dynamic output range is selected as a screen range having a minimum grey value of 14 and a maximum grey value of 220. Thus, the dynamic output range is 220−14=206. Mapping the input grey values to the dynamic output range is performed as described above. The percentage of input pixels within each segment is determined to weigh the transformation. For example, in the first segment between input grey value 5 and 102, the percentage of input pixels is 88 percent of the entire sum of input pixels for all segments. Mapping the segment point (input grey value 102) is found by:

$$(220-14) \times 0.888 = 183.$$

The dynamic range of the screen used (220−14) is multiplied by the percentage of input pixels in the present segment to get a boundary of the first output segment leg which is 183 grey levels. Thus, from the minimum output boundary at grey level 14, a range of 183 defines the end point of the first output segment at grey value 197. Therefore, the input grey space between grey levels 5 and 102 are mapped to output grey levels 14 to 197. Similarly, the input grey values of the second segment between grey values 102 and 171 ($R_{max}$) are mapped to a second output segment between output grey values 197 and 220 (screen max) which is the remaining segment of the dynamic output range.

Figure 7:
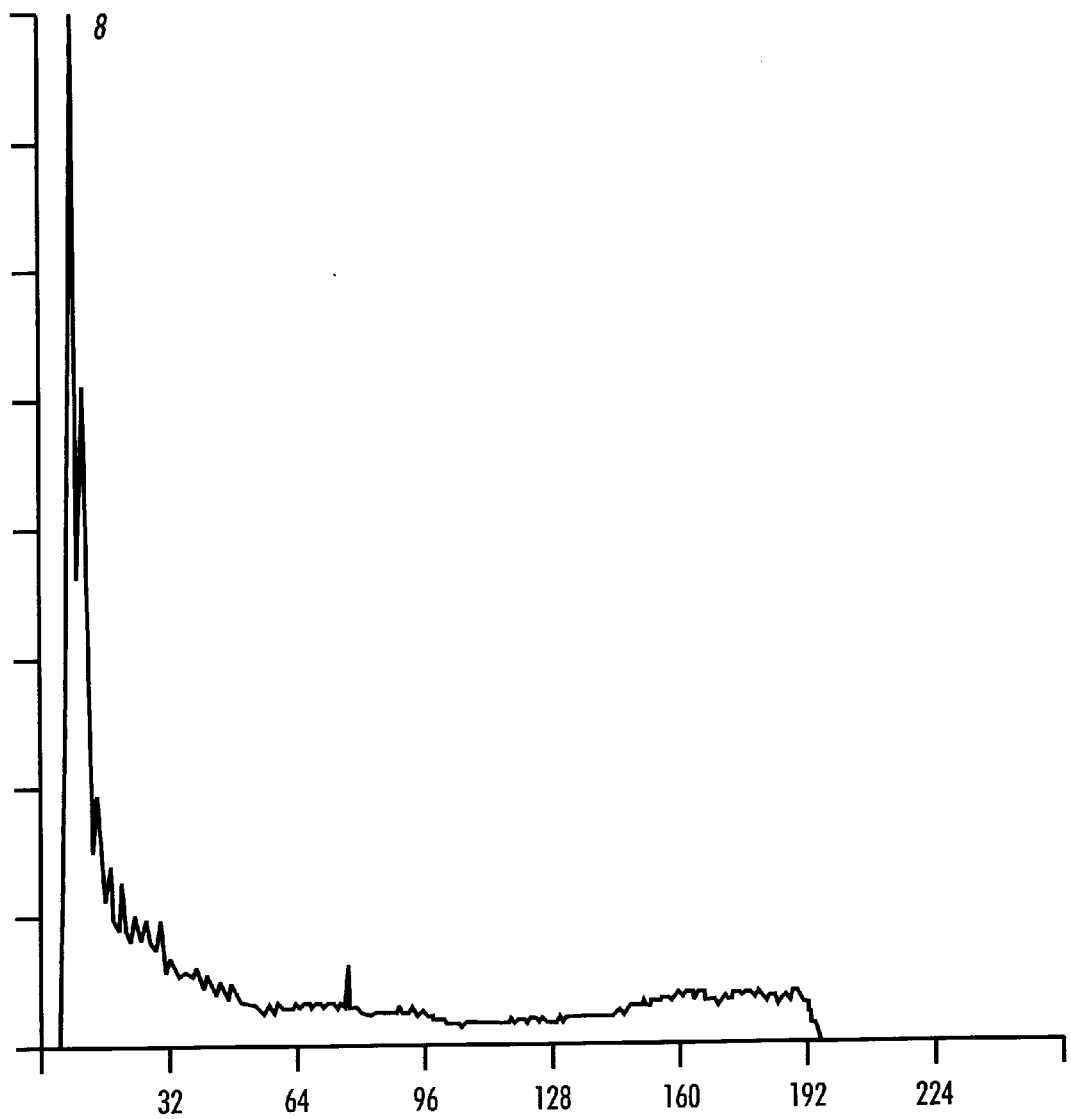
FIG. 7 illustrates histogram data for another color photograph.

With reference to FIG. 7, a piecewise linear transformation is generated for a color photograph of a man in a lab with test equipment and computers (1480×1677 pixels). The absolute dynamic input range is computed as: $R_{min}=1$ and $R_{max}=196$. The plot of the image histogram in FIG. 7 shows that the shadow region is dominant in this photograph. If this photo is reproduced by screening without dynamic output range adjustment, the reproduced image would be quite dark. Furthermore, since most of the image detail is in the shadow region, it is lost. However, the highlight areas would reproduce well.

As before, if the image is screened after adjusting the dynamic range with the "classical" method (maximum dynamic range=255), the reproduction produced a lot of saturated highlight areas. The maximum dynamic range term could be adjusted downward to eliminate the saturated areas, however, other than a very slight increase in perceived sharpness, little improvement was seen in these images over the image screened without dynamic range adjustment.

Figure 8:
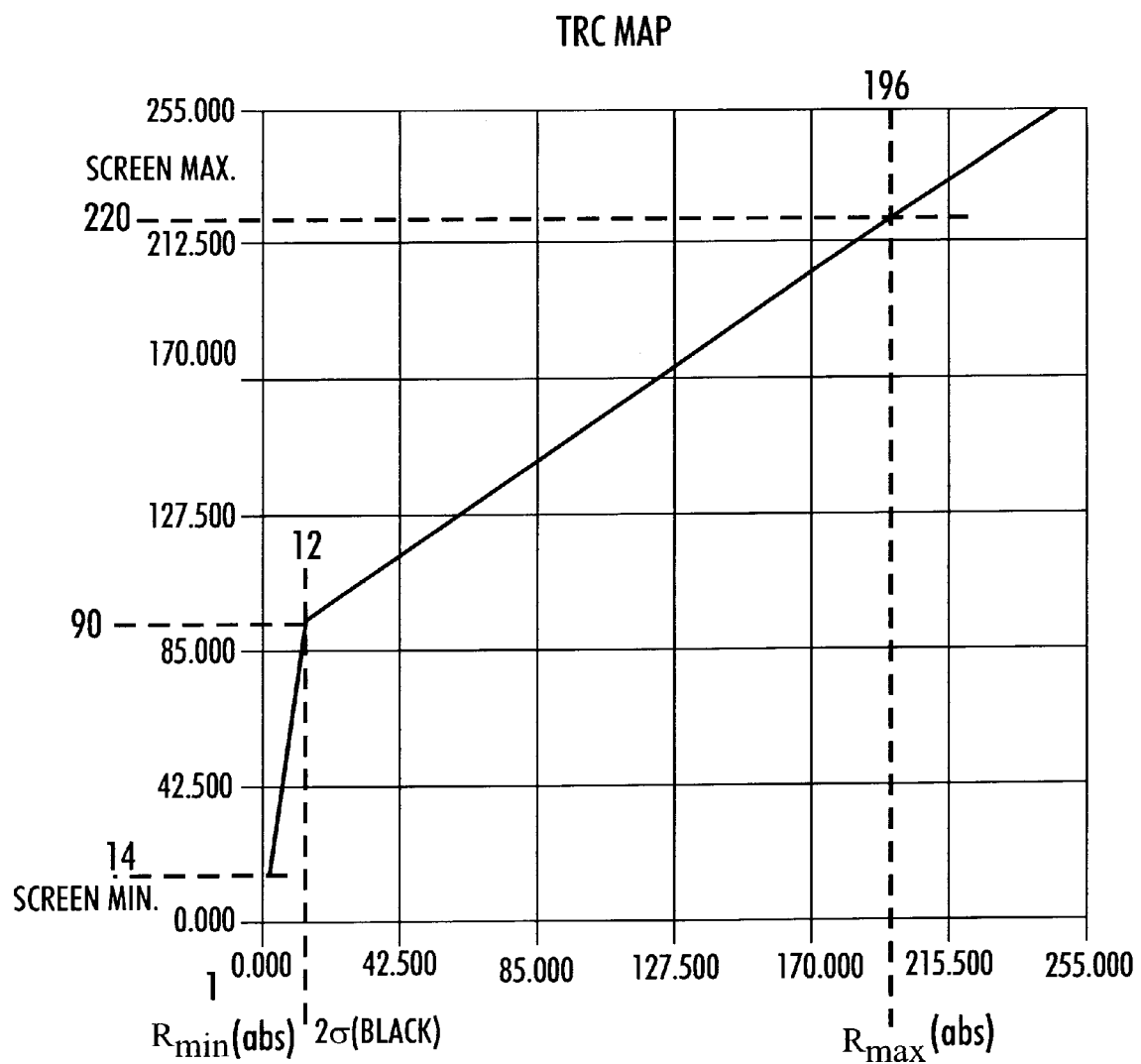
FIG. 8 illustrates a piecewise linear transformation map for the image of FIG. 7.

FIG. 8 shows a tone reproduction curve map for the image adjusted with a piecewise linear transformation of the present algorithm. Most of the shadow detail which appears in the first segment (input grey values 1 to 12) can be brought out by mapping the majority of the output grey levels to the shadow region. Furthermore, the highlight detail is preserved with a second linear transformation from the shadow region to the highlight region defined by a second segment (input grey values 12 to 196). If the overall aim is to reproduce the image detail in both the shadow and highlight regions without saturation, then this piecewise linear transformation produces the best image. There is some contouring noted in the highlight areas, and this image does not appear as sharp or "contrasty" since there is little solid black or white due to limiting the dynamic output range to that of the screen (output grey values 14 to 220).

With further reference to FIGS. 7 AND 8, the segment point is computed at input grey value 12 based on determining a black peak point at input grey value 8 and finding approximately a 2 sigma (¼ peak) value from the black peak which gives the value of 12. Thus, the first input segment is selected from input grey levels absolute $R_{min}=1$ to grey level 12 and the second input segment is from grey level 12 to absolute $R_{max}=196$. Since there are not any background pixels in this image, the $R_{max}$ value is determined based on the 3 percent cut-off rule explained above. The segment point at grey level 12 was selected as it is about 2 standard deviations (2 sigma) from the black peak of the shadow region. This is computed by analyzing the histogram and determining a grey value which has about a one fourth peak height of the black peak height in the histogram as fully described in U.S. Pat. No. 5,751,848.

The first output grey level segment is computed and selected from the minimum screen value (14) to output grey level 90. The grey level 90 is computed from:

(Percentage of total input pixels falling within first input segment)*(the range of the halftone screen used).

Inserting the appropriate values gives: 0.367*(220−14)=76. The value 76 is the length of the first output segment which puts the end point at grey value 90 (76+14=90). Therefore, the input grey space between grey levels 1 and 12 are mapped to output grey levels 14 to 90. When reproducing this image, a lot of detail is brought out in the shadow areas because the first segment range of 12 grey levels is mapped to a larger output segment range of 76 grey levels.

Once the end points of the first segment are known (1, 14) and (12, 90), a slope is determined therebetween and the grey values in the first segment are mapped to the first output segment grey values based on the slope. Likewise, the end points of the second input segment (12, 90) and (196, 220) define a slope therebetween which is used to transform the grey levels of the second segment to the second output segment grey levels as shown in the generated tone reproduction curve map of FIG. 8.

Figure 9:
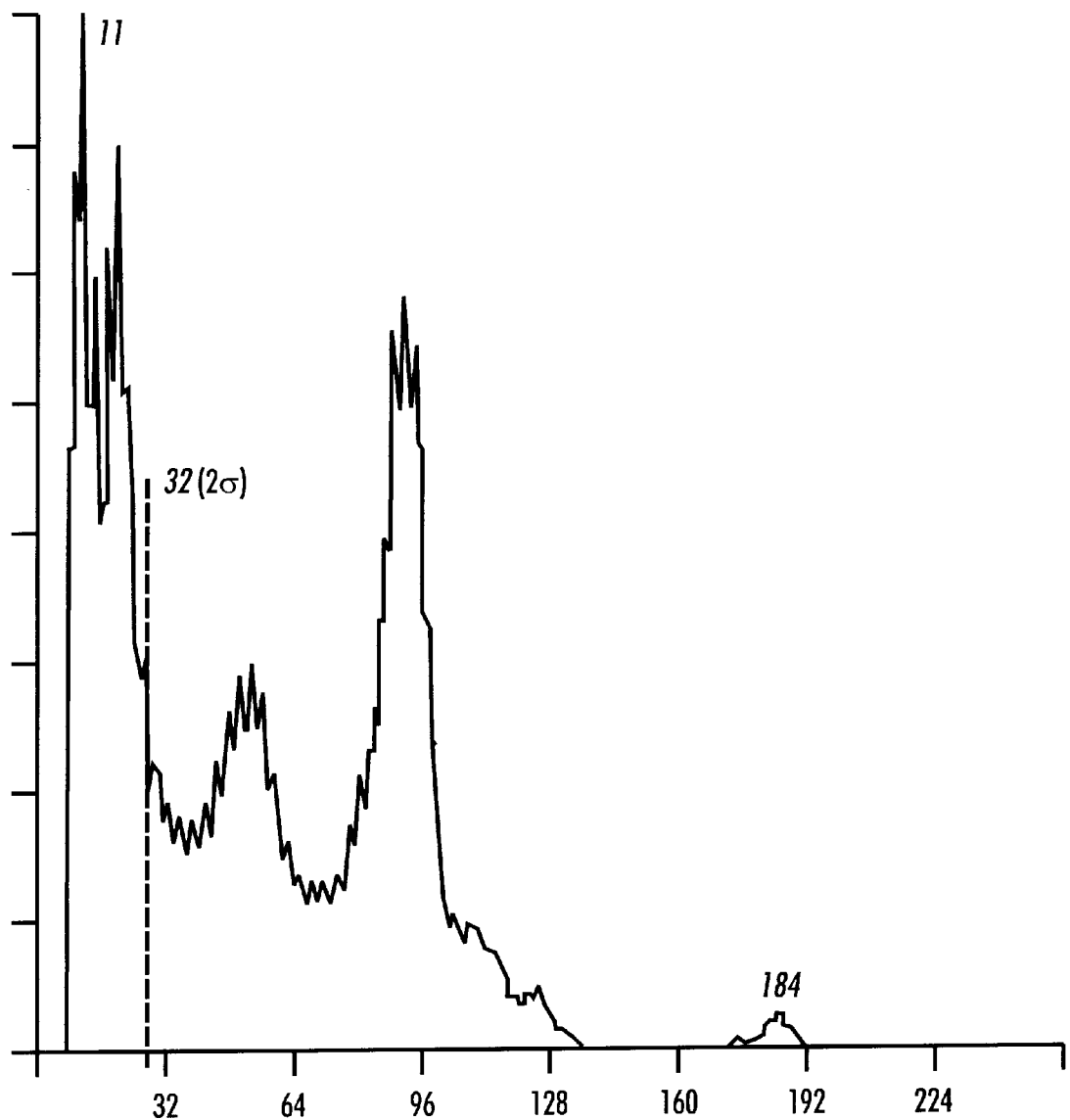
FIG. 9 shows histogram data for a black and white photograph.

With reference to FIG. 9, histogram data is shown for a black and white photograph (1072×1312) to illustrate another piecewise linear transformation. The photograph used is a standard black and white boat and dock scene (1072×1312 pixels). The absolute dynamic input range is $R_{min}=4$ and $R_{max}=191$. A plot of the histogram of the image in FIG. 9 shows that the shadow region is dominant in the photograph. Note that unlike the previous two image histograms, this histogram has distinct peaks. If this image is screened without dynamic range adjustment, the image is reproduced being rather dark with a loss of detail in the shadow region. Since there is no background in this image, the dynamic range can be adjusted using the "classical" method of a linear transformation which uses $R_{min}$ and $R_{max}$ only. The maximum dynamic output range can be set to 200 in order to eliminate highlight saturation. This is due in part to the fact that when the maximum dynamic range is 255 the tone reproduction curve map will saturate at $R_{max}$, in this case at grey level 113 (sum of pixels of grey values greater than 113 are less than 3 percent of the total sum). Thus, the entire highlight region will be saturated. By setting the dynamic range equal to 200, the slope of the tone reproduction curve map is changed which moves the saturation point in the map to a higher grey level.

Figure 10:
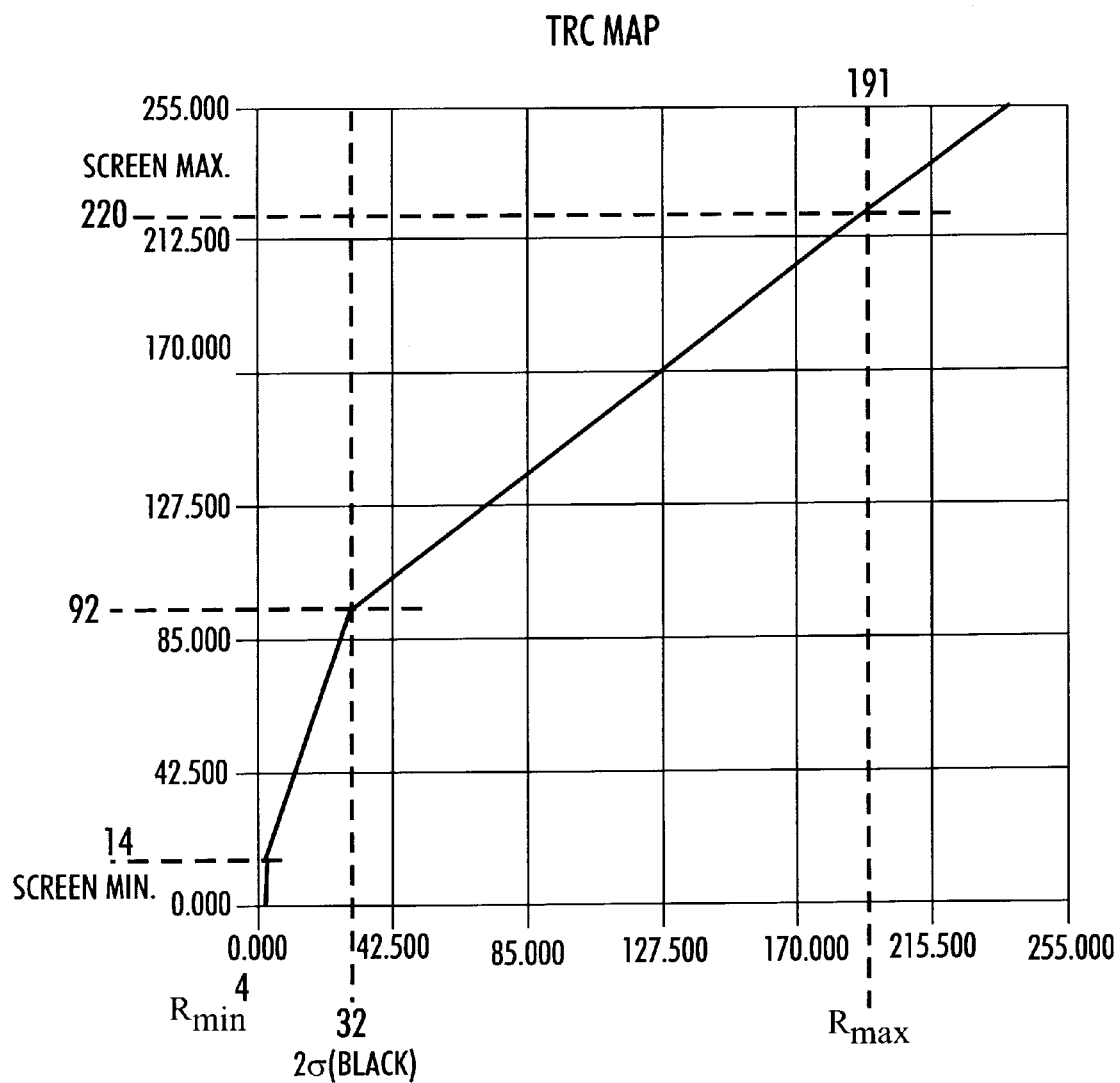
FIG. 10 shows a piecewise linear transformation for the histogram of FIG. 9.

FIG. 10 shows a piecewise linear tone reproduction curve generated from the histogram data of FIG. 9. This transformation improves the shadow detail rendition as compared to the "classical" transformation. This is a result of an effective expansion of the dynamic range in the shadow region. To generate the piecewise linear transformation, the histogram of FIG. 9 is analyzed to determine one or more segment points. In this case one segment point is determined which then defines two segments along the input grey values. From the histogram, a black peak is found at input grey level 11. From the black peak, a segment point is computed and selected from about two standard deviations (2 sigma) from the black peak which is at grey level 32.

The 2 sigma point is selected to be at a grey value having about a ¼ peak height of the black peak height. Having a segment point at grey level 32 defines a first segment between grey level 4 and 32 and a second segment from 32 to 191. Next, a dynamic output range is selected, in this case, to be a screen range between output grey values 14 and 220. The segment point value 32 is then mapped to an output grey value as described above. The percentage of input pixels contained in the first segment between $R_{min}$ (4) and input grey level 32 is about 37.6 percent of the total number of input pixels. Then, the dynamic range of the output screen used (220−14=206) is multiplied by the pixel percentage 0.376 which gives the length of the first output segment leg:

(220−14)×0.376=78.

Thus, the end point of the first output segment is 14+78=92. Therefore, the input grey space between grey levels 4 and 32 are mapped to output grey levels 14 to 92. Knowing the end points (4, 14) and (32, 92), a slope is determined which forms the basis of the linear transformation between the input first segment to the output first segment. Accordingly, the second input segment between grey values 32 and 191 are mapped to a second output segment based on the slope between end points (32, 92) and (191, 220).

Figure 11:
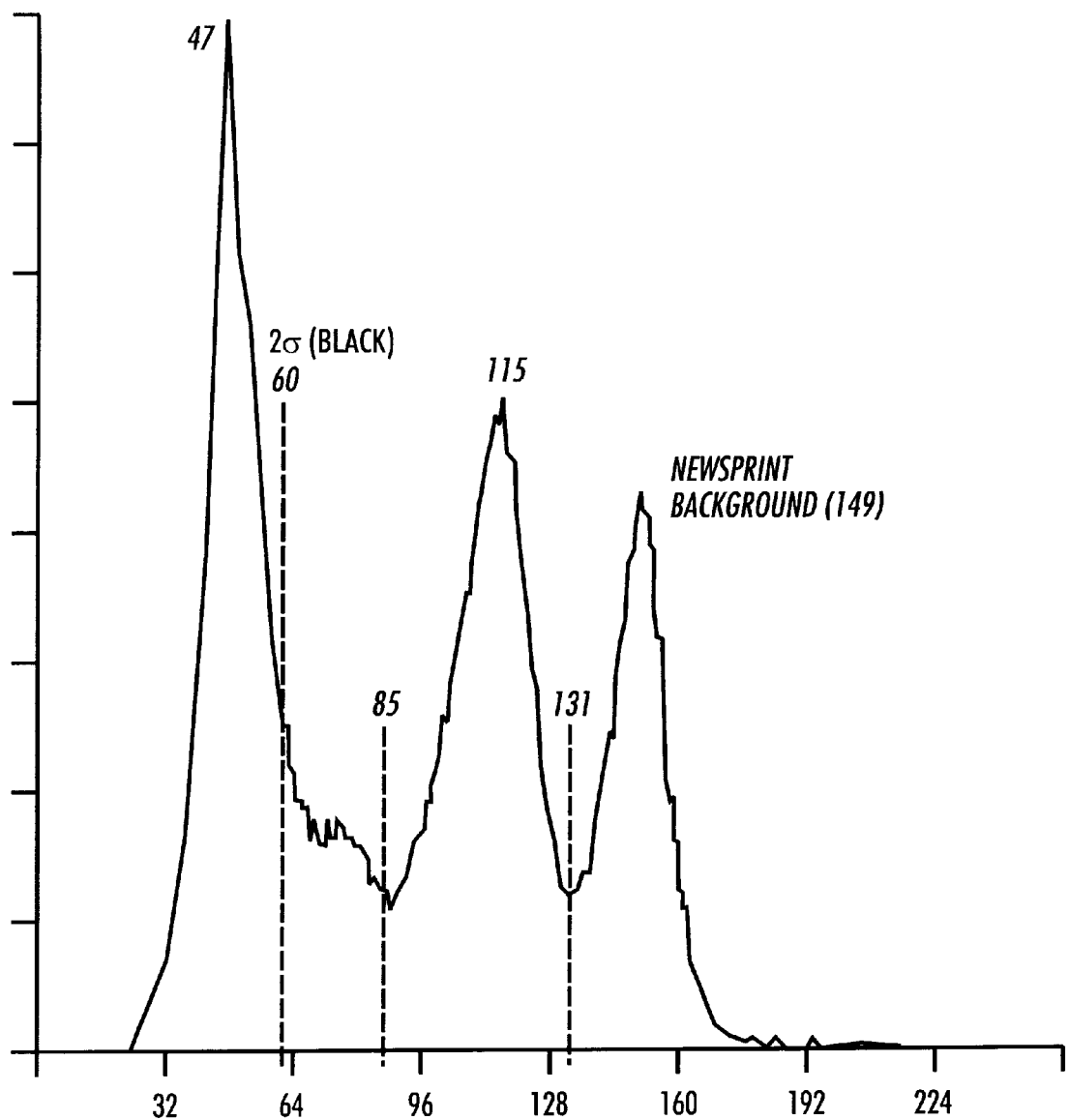
FIG. 11 shows histogram data for a low frequency half-toned color photograph.
Figure 12A:
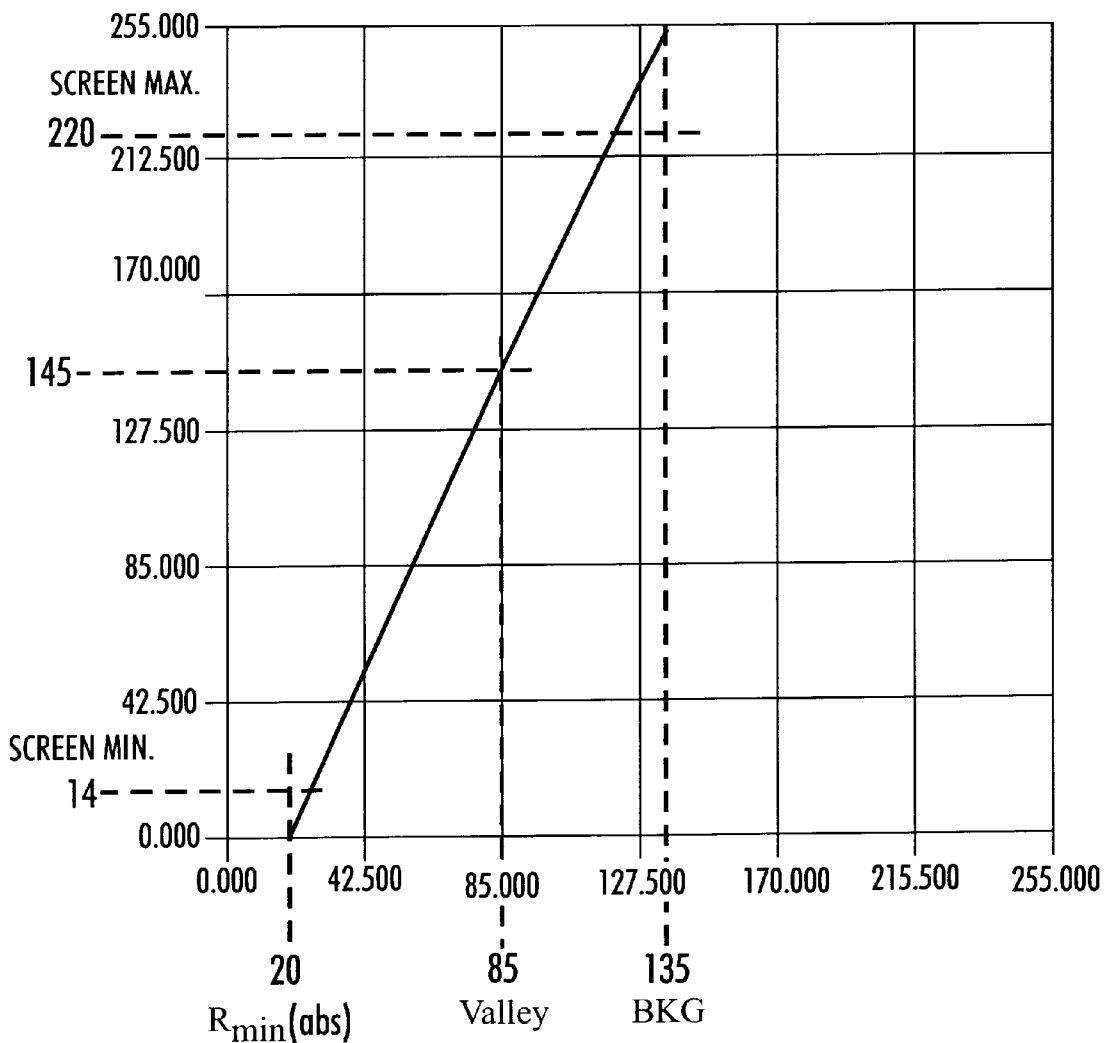
FIG. 12A illustrates a piecewise linear transformation map for the image of FIG. 11 using a valley point as a segment point.
Figure 12B:
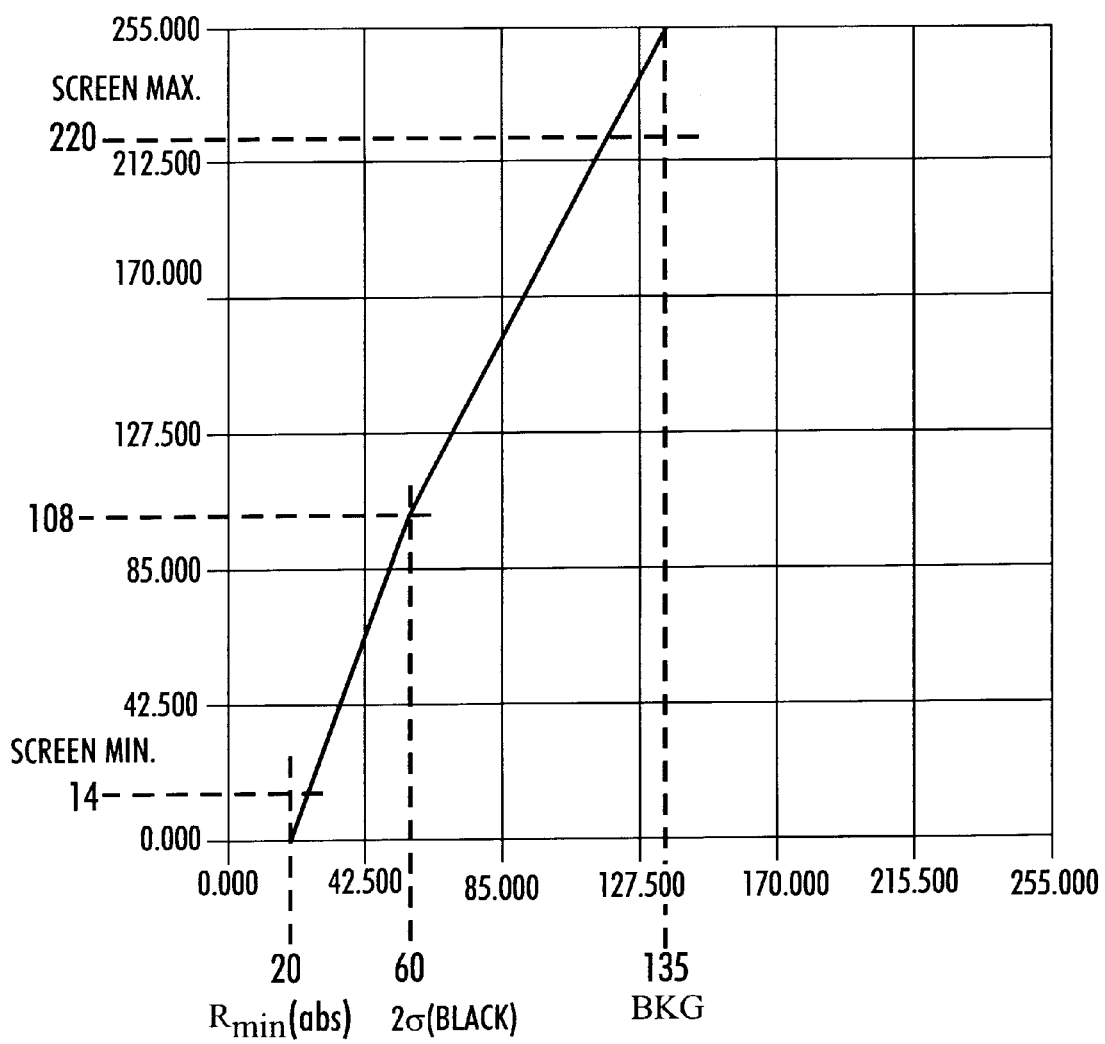
FIG. 12B illustrates a piecewise linear transformation map for the image of FIG. 11 using a ¼ black peak value as the segment point.

With reference to FIGS. 11, 12A, and 12B an example of a dynamic range adjustment via piecewise linear transformation for a halftoned color pictorial printed on newsprint is shown. FIG. 11 shows a plot of the image histogram. It is a low frequency halftone photo (85 dpi screen) cropped with a small amount of newsprint background for a border (1146×474 pixels). This type of image is inherently difficult to reproduce: The graphic in the left of the image has a blue background and a lot of detail in the shadow region, while the graphic to the right of it has a light yellow background with detail in the high light region. Upon analyzing the histogram data, an absolute dynamic range is computed as: $R_{min}$=20 and $R_{max}$=223. A background grey value is computed at input grey value 135.

Analysis of the histogram data determines a black peak at grey level 47, a 2 sigma point (¼ black peak value) at grey level 60, a first valley at grey level 85, a peak at grey value 115, a second valley at grey level 131 and the background threshold value at grey level 135. Reproducing the screen image after the dynamic range is adjusted via the "classical" method, some of the shadow detail in both graphics will be lost and some of the newsprint background will be reproduced.

With reference to FIG. 12A, a piecewise linear tone reproduction curve is shown which is generated for the histogram of FIG. 11. In this case, the segment point is selected to be at the first valley grey value 85. Thus, the dynamic input range includes two segments, the first defined between $R_{min}$ (20) and 85, and the second segment is defined between grey value 85 and 135. The dynamic output range is selected as the entire system range which for an 8 bit system is 0 to 255.

The piecewise linear transformation for FIG. 12A is found as follows:
The black peak is determined at grey level 47.
A segment point is computed at input grey level 85 which is at a valley between the black peak (47) and adjacent peak (115).
Percentage of input pixels in first segment between $R_{min}$ (20) and grey level 85=56.8 percent.
Output range (255)*pixel percentage (0.568)=145.

Thus, the first output segment is defined between 0 and 145. The input segment point (85) is mapped to the first output segment end point 145. The input boundary values of 20 and 135 are mapped to the output boundary values 0 and 255, respectively. The slope is then determined for each segment and the remaining input grey values are mapped to output grey values based on the slope of their corresponding segment.

With reference to FIG. 12B, a piecewise linear tone reproduction curve for the histogram of FIG. 11 is shown. The difference between the map of FIG. 12B from the map of FIG. 12A is that in FIG. 12B, the transformation selects a segment point using the 2 sigma value (¼ black peak) rather than at a valley point 85. In this case, the 2 sigma point is at grey level 60. The percentage of input pixels between $R_{min}$ (20) and the segment point 60 is 42.3%. Then, multiplying the dynamic output range 255 times the percentage (255*0.423) gives a value of 108. Thus, a first output segment is defined between 0 and 108 and a second output segment is defined between 108 and 255. The input grey value of 60 at the segment point is mapped to the output segment point value of 108. Similarly as discussed above, the slope for each input segment is computed and the input grey values are mapped to the output grey values in their corresponding segments based on the slope of their segment which gives an overall piecewise linear transformation.

Alternately, the dynamic output range can be selected as a halftone screen range, for example, with a screen minimum at output grey level 14 and a screen maximum at an output grey level 220. Tone reproduction curves can also be generated as described above using either a segment point at the valley 85 or at the 2 sigma point 60. These various piecewise linear transformation options can be made available to a user so that various reproductions can be generated based on the original input image. The only difference between the tone reproduction curve maps generated for the entire system output range or the halftone screen range is that the map in the halftone screen range has a positive slide of 14 grey levels which effectively maps input grey levels from the absolute $R_{min}$ to the background level to the dynamic range of the screen (14–220). In the transformation using the halftone screen, an input segment point at 85 would be mapped to an output grey value of 131, whereas, an input segment point of 60 (2 sigma) would be mapped to an output grey value of 103.

In order to assess the differences in detail reproduction between the different methods, a halftone screen was applied to the image even though one does not normally apply a halftone screen to a low frequency halftoned image. If the dynamic range is adjusted via the "classical method", some of the shadow detail in both the blue and yellow graphics is lost and some of the newsprint background is also reproduced which is undesirable.

When the image is reproduced with a piecewise linear transformation and the output dynamic range equal to 255, the blue graphic with large amounts of shadow detail shows more detail reproduced that with the "classical method". The yellow graphic with large amounts of detail in the highlight region also has more detail reproduced. When we constrain the output dynamic range to that of the applied halftone screen, even more highlight detail in the yellow graphic is reproduced. In either case, no newsprint background is reproduced.

Figure 13:
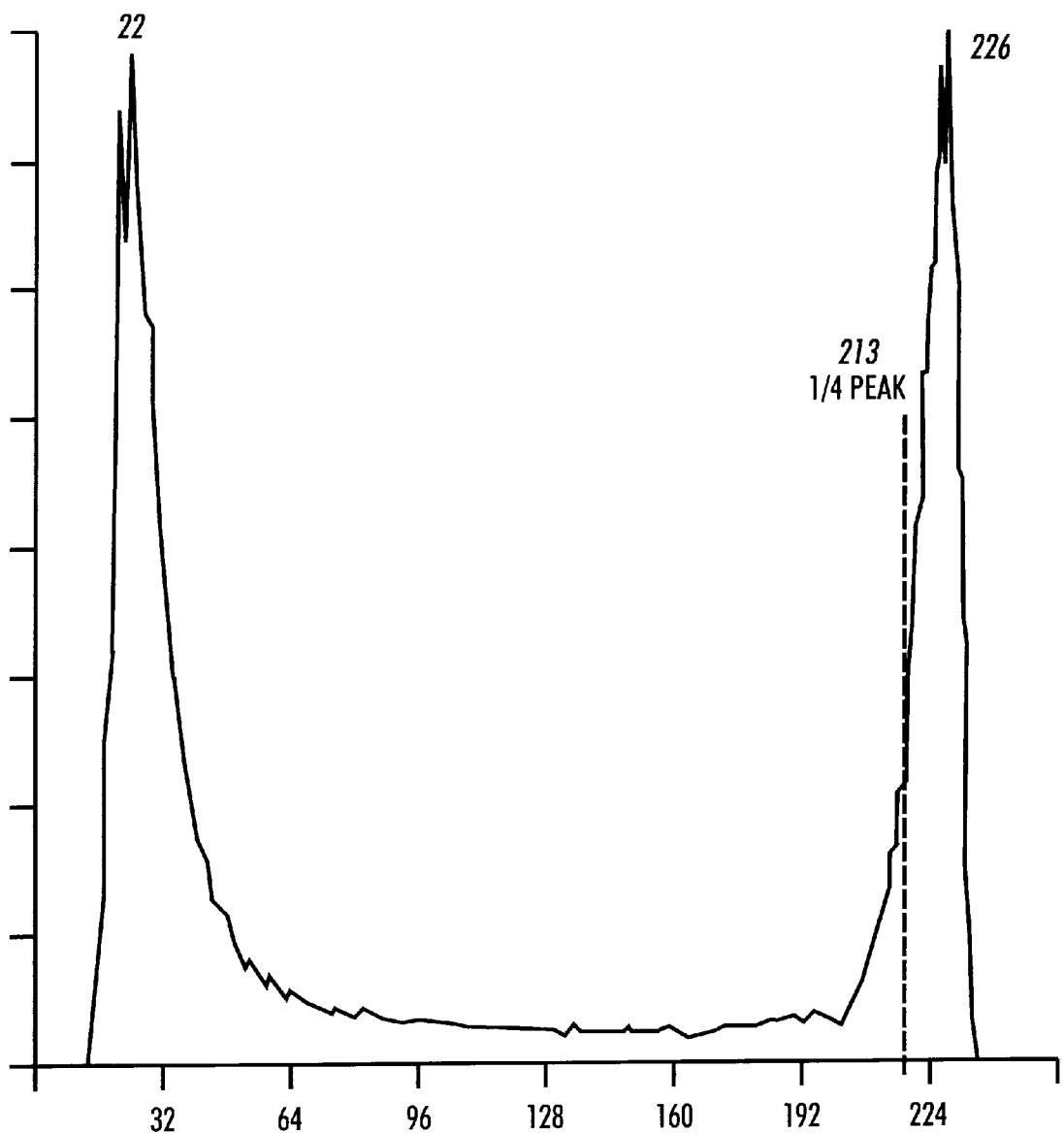
FIG. 13 shows histogram data for another image pattern.

FIG. 13 shows histogram data of a difficult image to reproduce. It is a high frequency halftone (150 dpi screen) photo cropped with a border of white background (coated paper). An absolute dynamic input range is computed at: $R_{min}$=11 and $R_{max}$=238. In this case, analysis of the histogram shows that background grey values exist and a background threshold value is computed at 213 which is about a ¼ peak value of the background peak value 226.

The histogram data of FIG. 13 shows two dominant peaks widely spaced in the outer density regions. Note this is a high contrast image with some amount of image information in the grey levels between the two peaks. Further analysis of the histogram data shows that it is bimodal with widely spaced peaks making it difficult to distinguish a "valley" between them. Thus, the present algorithm is limited to selecting a segment point based on a 2 sigma (¼ black peak) value in order to generate a piecewise linear transformation.

Figure 14:
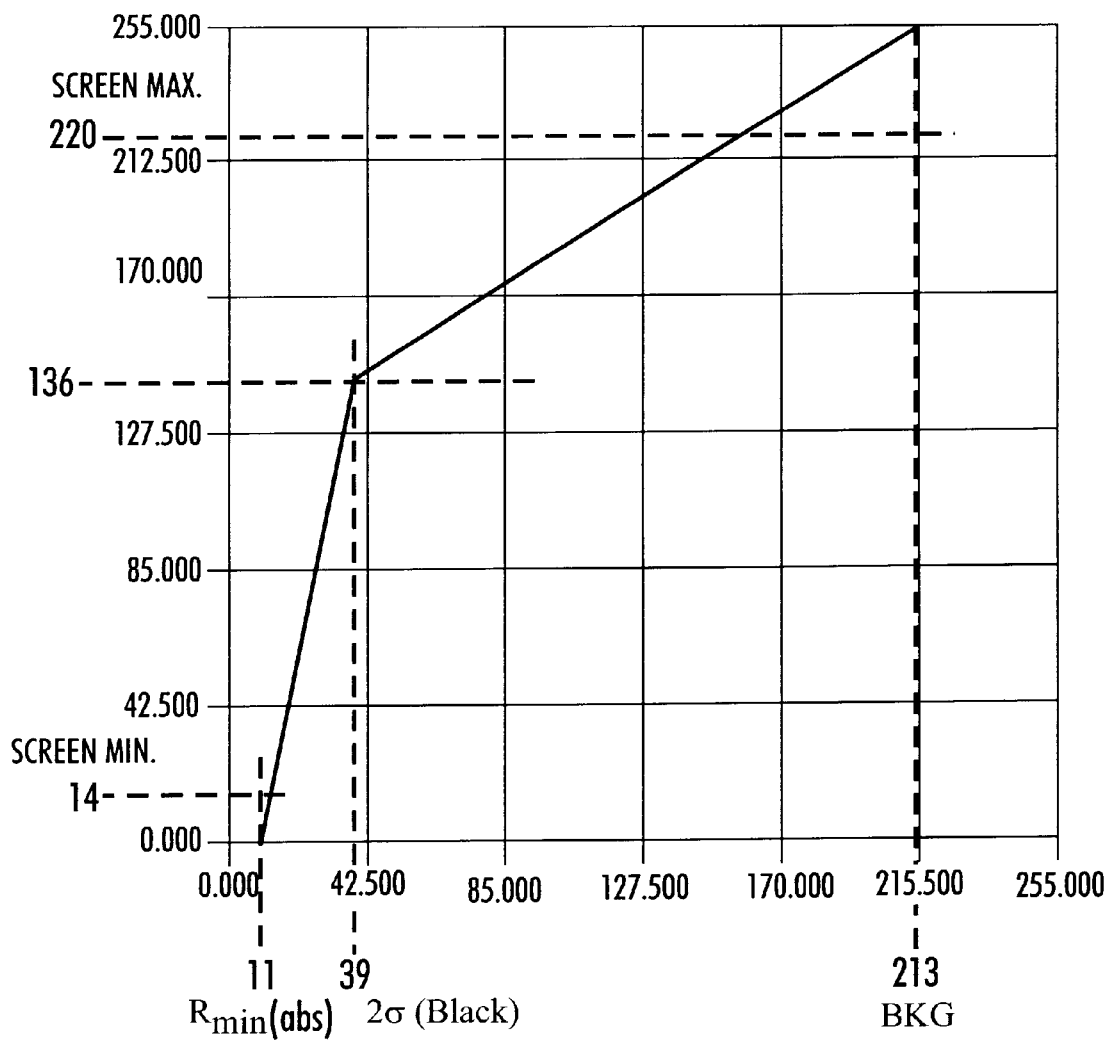
FIG. 14 shows a piecewise linear transformation map generated from the data of FIG. 13.

FIG. 14 illustrates a piecewise linear tone reproduction curve map generated from the histogram data of FIG. 13 using a dynamic output range of the system (0 to 255). $R_{min}$ was determined using the 3 percent rule at grey level 11 and the maximum boundary is set at grey level 213 since this image has background values which will be suppressed. The segment point is computed at grey level 39 based on a black peak value of 22 and the 2 sigma point (¼ black peak). Two input segments are thus defined for the input grey values. Based on the percentage on pixels on the first segment, the segment point 39 is mapped to output grey level 136. As previously explained above, the slope of each segment is determined and the input grey values are mapped to the output grey value segments in a piecewise linear transformation. Alternately, the dynamic output range can be selected as a halftone screen range, for example, between output grey levels 14 and 220.

If the image is processed by adjusting the dynamic range with the "classical method", background is suppressed but much of the shadow detail is lost. When the image is reproduced using a piecewise linear transformation with the output dynamic range equal to 225, much of the shadow detail is brought out. Much of the highlight detail is saturated. If the output dynamic range is limited to the range of the applied halftone screen, highlight reproduction improves.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A method of generating a real-time tone reproduction curve which enhances an image being reproduced comprising:
    scanning a portion of the image and determining input grey values which form the image;
    generating a histogram of frequency distributions of the input grey values; and
    generating a tone reproduction curve for transforming the input grey values to output grey values based on the histogram of the input grey values, the generating of the tone reproduction curve further including,
        analyzing the histogram,
        determining input boundary grey values including a minimum input grey value and a maximum input grey value such that substantially all the input grey values to be reproduced are within the input boundary grey values,
        determining at least one segment point based on the frequency distributions of the input grey values, the at least one segment point being between the input boundary grey values,
        mapping the minimum input grey value to a minimum output grey value,
        mapping the maximum input grey value to a maximum output grey value.
        mapping the at least one segment point to an output grey value based on the frequency distributions of the input grey values, and,
        mapping the remaining input grey values based on a slope defined between the input boundary grey values and the at least one segment point.

2. The method as set forth in claim 1 wherein the transforming includes a piecewise linear transformation.

3. The method as set forth in claim 2 wherein the piecewise linear transformation defines at least two different linear transformations which map the input grey values to the output grey values.

4. The method of generating as set forth in claim 1 wherein mapping the at least one segment point is based on a percentage of the input grey values within a first input segment defined by the minimum input grey value and the segment point.

5. The method of generating as set forth in claim 1 further includes determining a background grey value from the histogram and setting the maximum input grey value equal to the background grey value if the background grey value exists.

6. The method as set forth in claim 1 further including grouping the input grey values in a plurality of segments based on the histogram; and
    mapping the input grey values to output grey values in accordance with a plurality of linear transformations defined by the plurality of segments.

7. The method as set forth in claim 6 wherein the input grey values are mapped to the output grey values based on a slope defined between each of the plurality of segments.

8. The method as set forth in claim 1 wherein the tone reproduction curve is generated as a look-up table.

9. The method as set forth in claim 1 wherein the generating a tone reproduction curve includes:
    setting input boundary values for the input grey values based on the frequency distributions of the histogram;
    dividing the input grey values into a plurality of input segments defined by at least one segment point and the input boundary values, the at least one segment point being set at an input grey value which is determined based on an identifiable characteristic in the histogram;
    setting output boundary values for the output grey values;
    dividing the output grey values into a plurality of output segments based on an associated input segment from the plurality of input segments; and
    mapping each of the plurality of input segments to an associated output segment according to a different linear transformation.

10. The method as set forth in claim 9 wherein the identifiable characteristic of the histogram includes determining at least one of a valley point or a ¼ black peak point.

11. A method of automatically generating a piecewise linear transformation from an image histogram of input grey value frequency distributions, the method comprising the steps of:
    analyzing the input grey value frequency distributions;
    defining a plurality of input grey value segments based on the input grey value frequency distributions;
    determining a plurality of linear transformations, one linear transformation associated for each of the plurality of input grey value segments, for mapping input grey values to output grey values, the plurality of linear transformations including at least two different linear transformations; and,
    determining at least one segment point based on an input grey value located at an identifiable characteristic in the input grey value frequency distributions of the image histogram.

12. The method as set forth in claim 11 wherein the identifiable characteristic is one of a valley or a peak.

13. The method as set forth in claim 11 wherein the at least one segment point is defined as an input grey value being offset from the input grey level located at the identifiable characteristic.

14. The method as set forth in claim 11 wherein each linear transformation of the plurality of linear transformations transforms its associated input grey value segment in accordance with a sum of input grey values contained within the associated input grey value segment as compared to a total sum of input grey values in the plurality of input grey value segments.

15. The method as set forth in claim 11 further including;
    generating a tone reproduction map in accordance with the plurality of linear transformations;

automatically generating a tone reproduction curve based on the histogram data;

determining the at least one segment point based on the histogram data; and mapping the input grey values to output grey values based on the at least one segment point.

16. A method of generating a real-time tone reproduction curve which enhances an image being reproduced, said method comprising the steps of:

scanning a portion of the image and determining input grey values which form the image;

generating a histogram of frequency distributions of the input grey values; and generating a tone reproduction curve for transforming the input grey values to output grey values based on the histogram of the input grey values including, setting input boundary values for the input grey values based on the frequency distributions of the histogram, dividing the input grey values into a plurality of input segments defined by at least one segment point and the input boundary values, the at least one segment point being set at an input grey value which is determined based on an identifiable characteristic in the histogram, setting output boundary values for the output grey values, dividing the output grey values into a plurality of output segments based on an associated input segment from the plurality of input segments, and, mapping each of the plurality of input segments to an associated output segment according to a different linear transformation.

17. The method as set forth in claim 16 wherein the identifiable characteristic of the histogram includes determining at least one of a valley point or a ¼ black peak point.

* * * * *